(No Model.) 2 Sheets—Sheet 1.

J. W. LUFKIN.
STOP MECHANISM FOR SEWING AND OTHER MACHINES.

No. 347,053. Patented Aug. 10, 1886.

Witnesses. Inventor:
John W. Lufkin
by Crosby & Gregory
Attys.

N. PETERS, Photo-Lithographer, Washington, D. C.

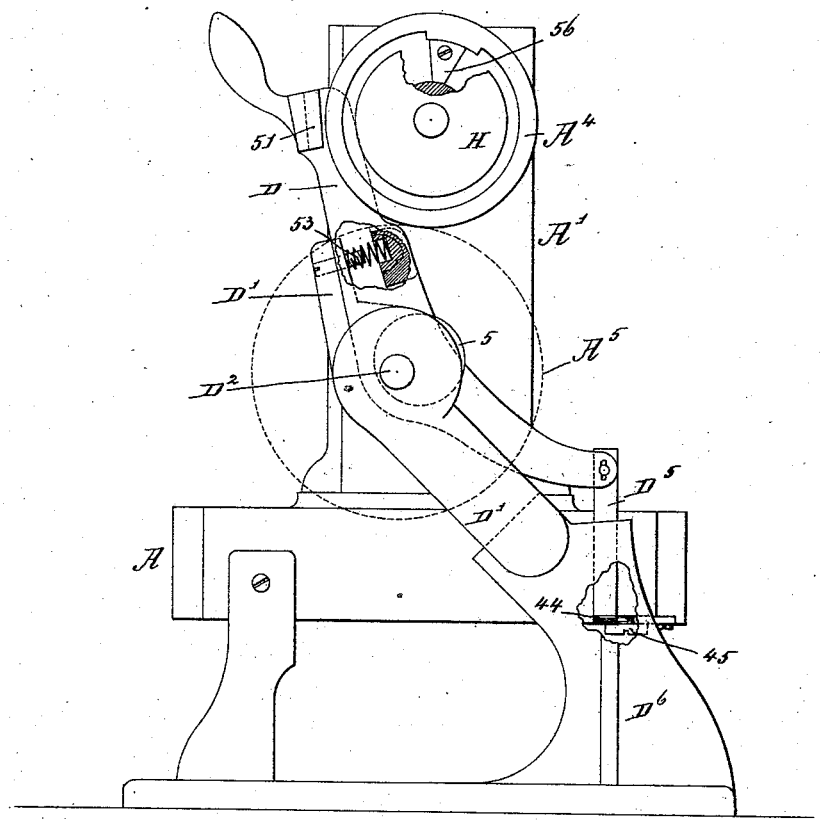

UNITED STATES PATENT OFFICE.

JOHN W. LUFKIN, OF WINCHESTER, MASSACHUSETTS.

STOP MECHANISM FOR SEWING AND OTHER MACHINES.

SPECIFICATION forming part of Letters Patent No. 347,053, dated August 10, 1886.

Application filed January 8, 1886. Serial No. 187,974. (No model.)

*To all whom it may concern:*

Be it known that I, JOHN W. LUFKIN, of Winchester, county of Middlesex, and State of Massachusetts, have invented an Improvement in Stop Mechanism for Sewing and other Machines, of which the following description, in connection with the accompanying drawings, is a specification, like letters on the drawings representing like parts.

This invention has for its object to provide for sewing and other machines means whereby the same may be stopped at a definite time—as, for instance, when an article to be made by the machine has been finished.

In accordance with my invention, a friction-pulley fast to the main shaft of the machine is acted upon by the periphery of a belt-driven pulley, which rotates on a hub of a lever pivoted eccentrically to the said hub, the lever being held in place with its periphery in driving contact with the pulley on the main shaft by means of a holding-bar, which, as herein shown, is actuated in one direction by a lever and cam, and in the other direction by a spring.

Figure 1:
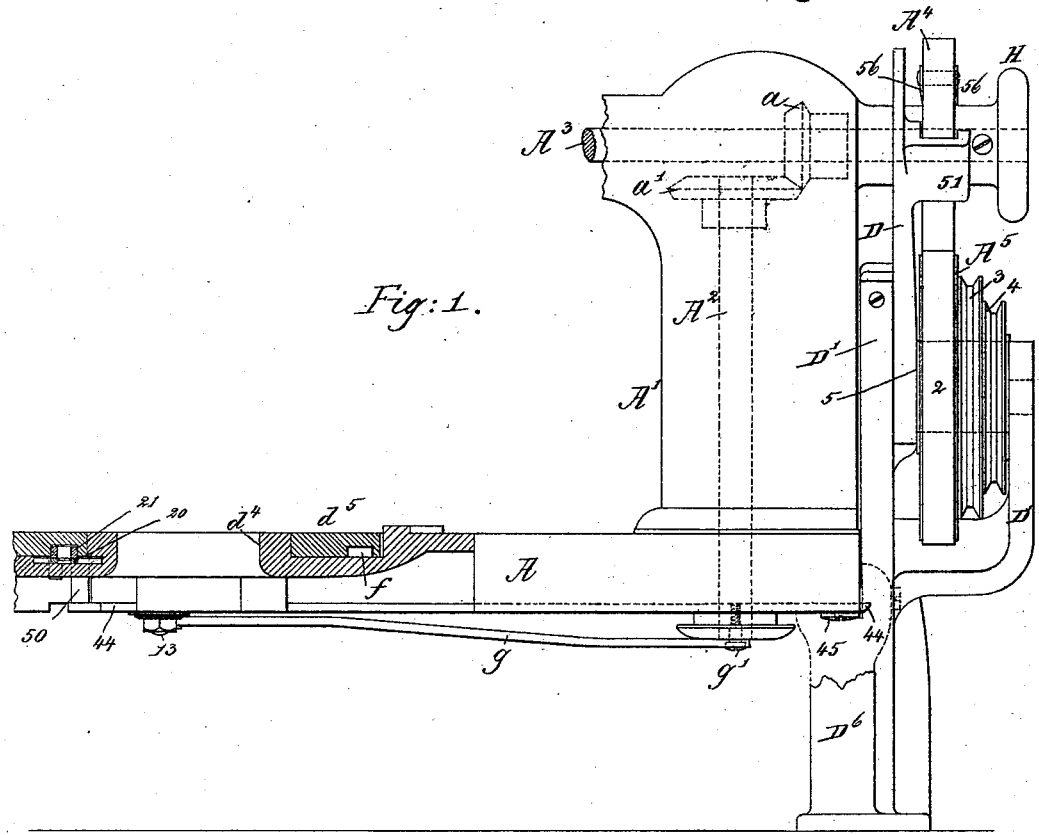
Figure 2:
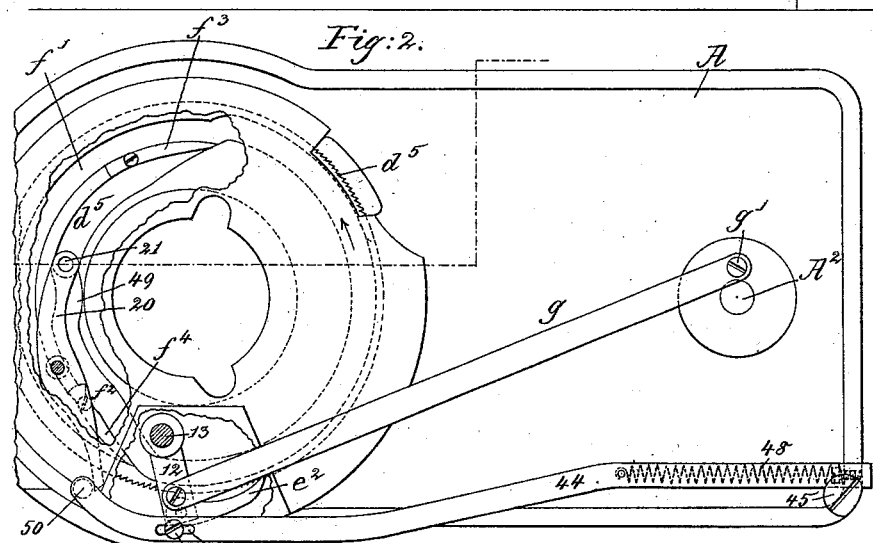

Figure 1 in broken side elevation represents a sufficient portion of a sewing-machine to illustrate my improvements; Fig. 2, a partial under side view; Fig. 3, a rear end view thereof, the belt-pulley being shown by dotted lines, so as not to hide the parts behind it, the hand-wheel being partially broken out; and Fig. 4 is a rear side view of the pulley on the main shaft.

The bed-plate A, upright arm A', main shaft $A^3$, its bevel-gear $a$, the bevel-gear $a'$, shaft $A^2$, crank or disk at its lower end provided with crank-pin $g'$, link $g$, arm 14, post 13, arm 12, the pawl $e^2$, moved by it, the feed-wheel $d^5$, having grooves $f$ $f'$, cross-grooves $f^2$, and switches $f^3 f^4$, the lever 20, having at one end a roller-stud, 21, are all substantially the same as like parts represented in my application, Serial No. 186,182, for United States Patent, filed December 19, 1885, to which reference may be had.

The main shaft $A^3$ has fast on it the friction-pulley $A^4$, the periphery of which is acted upon by the leather or other non-metallic face, 2, of the belt-pulley $A^5$, having scored places 3 4, for the reception of a driving-belt extended from any usual driven pulley.

The belt-pulley $A^5$ is mounted on a hub, 5, extended from one side of the pulley-carrying lever D, the said hub (shown by dotted lines in Fig. 1) being bored eccentrically and mounted upon a stud, $D^2$, having its bearings in ears of a yoke, D', forming part of the feet $D^6$, upon which the bed-plate of the machine is pivoted in usual manner.

The lever D has a brake-shoe, 51, which, when the peripheries of the pulleys $A^4$ and $A^5$ are not in driving contact, bears against the periphery of and stops the rotation of the pulley $A^4$ and shaft $A^3$, leaving them in position to keep the needle-bar (not shown, but actuated by the said shaft) in such position as to leave the needle raised to its highest point, such stopping of the pulley $A^4$ being effected by the wedge-like portion or stop 56 of the said pulley coming between the jaw-like portion of the brake-shoe. The lower end (see Fig. 3) of the lever D has a foot, $D^5$, which, when the machine is in operation, the wheel $A^5$, driving the wheel $A^4$, rests upon the end of the lever-holding bar 44, laid in guide-grooves at the lower side of the bed-plate and held therein, but so that it may slide longitudinally, by means of the screws 45 and 46, the latter entering a slot, 47, in the said bar 44. The holding-bar is normally held with its end beyond the bed-plate by the spring 48, (shown by dotted lines,) the said bar in such position supporting the foot $D^5$, and keeping the pulleys $A^5$ $A^4$ pressed together.

It is desired to stop the machine automatically after the completion of a button-hole. To do this, the feed-wheel $d^5$, besides having at its under side grooves $f f'$, and a cross-groove, $f^2$, and switches $f^3 f^4$, to act upon and move a lever, 20, having a roller-stud, 21, that travels in the said groove, as described in the said application, to vary the stroke of the pawl and pawl-carrier, in order to rotate the feed-wheel at a faster or slower speed, has also a rather sharp cam portion, 49, (see Fig. 2,) forming part of the groove $f^2$, into which the roller-stud 21 of the lever 20 enters as each button-hole is completed.

The position of the parts in Fig. 2 are such as will be occupied by them just before the completion of a button-hole, and in the further rotation of the feed-wheel $d^5$ in the direction of the arrow thereon the slot 21 will enter the cam portion 49, and the lever 20 will be moved far enough to cause its outer end to strike the pin or stud 50 at the inner end of the holding-bar 44 and draw it longitudinally, withdrawing the outer end of the said bar from under the foot $D^5$, when the lever D, having the weight of the pulley $A^5$ upon it and at one side of the stud $D^2$ will be turned, causing the pulley $A^5$ to be removed from driving contact with the pulley $A^4$, such movement of the lever D causing the brake-shoe 51 to meet the pulley $A^4$.

One of the arms of the yoke D′, next the lever D, has a spring, 53, which turns the said lever on the stud $D^2$ when the bar 44 is withdrawn from under the foot $D^5$. The foot $D^5$ is made adjustable on the said lever D, in order to enable the contact of the pulleys to be correctly made when the foot rests on the holding-bar.

The hand-wheel H is partially broken out in Fig. 3, to show part of the wedge portion 56.

I claim—

1. The feed-wheel, the lever D, and the belt-pulley thereon, and the holding-bar, combined with means intermediate the said feed-wheel and bar to move the said bar and release the said lever, substantially as described.

2. The shaft $A^3$ and its attached friction-wheel, and the pulley $A^5$, and the lever, and a hub, 5, and stud to support it eccentrically, combined with a holding-bar to sustain the said lever and maintain the said pulleys in contact, substantially as described.

3. The lever D, having attached to it the hub 5, and provided with a brake-shoe and with a foot, the stud to support the said lever eccentrically and the yoke to hold the stud, and belt-pulley mounted on the said hub, combined with the shaft $A^3$, and its attached friction-pulley A, having the stop to be engaged by the said lever or its brake-shoe to always stop the said pulley and the shaft $A^3$ in a definite position, substantially as described.

4. The main shaft $A^3$, its attached pulley $A^4$, the lever D, provided at one side with the hub, and having a foot, $D^5$, and shoe, the yoke and stud $D^2$, to support the said lever eccentrically to the said hub, combined with a spring to act upon the said lever, substantially as described.

5. The shaft $A^3$, its attached pulley $A^4$, the yoke, its stud, the lever having the hub 5, and pivoted eccentrically on the said hub, and the belt-pulley, combined with the holding-bar and with the adjustable foot resting thereon, to operate substantially as described.

In testimony whereof I have signed my name to this specification in the presence of two subscribing witnesses.

JOHN W. LUFKIN.

Witnesses:
G. W. GREGORY,
C. M. CONE.